United States Patent [19]
Hollingsworth

[11] Patent Number: 5,740,763
[45] Date of Patent: Apr. 21, 1998

[54] CHICKEN COOP LITTER REMOVAL APPARATUS

[76] Inventor: Tracy Hollingsworth, Rte. 2 Box 760, Oneonta, Ala. 35121

[21] Appl. No.: 585,711

[22] Filed: Jan. 16, 1996

[51] Int. Cl.⁶ ................................................ A01K 31/04
[52] U.S. Cl. ............................ 119/442; 119/442; 119/451
[58] Field of Search .................................... 119/442, 447, 119/451, 458, 479, 57.2; 56/10.3, 10.4, 12.7

[56] References Cited

U.S. PATENT DOCUMENTS

| | | | |
|---|---|---|---|
| 3,160,141 | 12/1964 | Crutchfield | 119/442 |
| 3,257,789 | 6/1966 | Carlson | 56/10.4 |
| 3,263,257 | 8/1966 | Stapleton, Sr. | 119/442 X |
| 3,707,141 | 12/1972 | Boer et al. | 119/458 |
| 3,750,376 | 8/1973 | Cioni | 56/10.4 |

FOREIGN PATENT DOCUMENTS 0022283  1/1981  Netherlands ........................ 56/10.4

*Primary Examiner*—Gene Mancene
*Assistant Examiner*—Yvonne R. Abbott
*Attorney, Agent, or Firm*—Kenneth Lee Cleveland

[57] ABSTRACT

This chicken coop litter removal apparatus that incorporates a frame under which a blade is pivotally mounted to extend outside the side of the frame to scrape along the walls of chicken coops. The blade is pivotally mounted to the frame held in its normal working position by tension. When the blade contacts an object such as a structural pole, it rotates relative to the frame backwards. A side bar is mounted to the frame to push the frame out slightly from the wall of the chicken coop as the blade passes the pole. When the blade passes the pole it returns to its original position because of the tension means but does not contact the wall because the frame was pushed slightly away from the wall by the side bar. The devise is mounted to a standard tractor using a type 3 trailer hitch and has two wheels one at each side rear so that it rolls easily.

7 Claims, 2 Drawing Sheets

CHICKEN COOP LITTER REMOVAL APPARATUS

BACKGROUND OF THE INVENTION

Chicken coops are constructed as large enclosures with interior structural supports. Chicken excrement (called litter) falls to the floor and collects throughout the coop. The most difficult areas to clean are along the walls near the structural supports. These areas usually have to be cleaned manually with shovels. The present invention is an automated device to clean chicken coops of litter along the structural supports and along the walls. The device is used in combination with a common barn tractor. There are several patents relating to plows for vineyards which form the background for the present invention.

U.S. Pat. No. 1,276,051 issued to Geirmann teaches the use of a push bar to force a pivotally mounted blade away from a tree. The blade must be manually reset to its original position.

U.S. Pat. No. 2,560,531 issued to Rentfrow uses a tension means to hold a blade out, a buffer guard to contact objects in the path of the blade and push the blade backwards.

These devices are designed to plow around trees in vineyards. The Rentfrow design is completely unsuitable for cleaning chicken coops. The mechanism is located immediately above the blade and hence subject to fouling by dirt and dust. Furthermore when the blade springs back to the original position, too much force is used and would damage the walls of a chicken coop. Such mechanisms tend to be too complex and subject to fouling.

Hydraulically operated blade devices such as those used for snow plows and road grading machines are likewise impractical because of size and cost. The present invention represents a significant improvement over existing devices for this specialized operation which is simple, inexpensive and can be hitched to a standard tractor currently in use by most chicken coop owners.

SUMMARY OF THE INVENTION

The invention is used in combination with a tractor. It starts with a frame with a left side and a right side of sufficient structural rigidity. At the front of the frame a standard type three tractor hitch is attached. The frame contains a central hub with a hole in it to accommodate a shaft. A blade arm is pivotably mounted to the frame by means of a shaft which is held in place in the central hub with pins and washers with the blade arm under the frame, it will rotate relative to the central hub about the axis of the shaft. A blade is removably mounted to the blade arm so that the blade protrudes past the side of the frame. A separate blade is used for the left side and for the right side and the blades cannot be used together as the arm pivots as the blade contacts an object in its path. A spring and tension pulley means is provided to return the blade to its original position when it is forced to rotate backwards. A backstop is provided on the blade which hits the frame and prevents the blade from rotating forward of its initially set position. A side bar is mounted to the frame above the blade to contact a pole or other structural object and thrust the frame sufficiently far from the support to prevent the blade from contacting the wall of the chicken coop when it returns to its original position thereby preventing damage to the wall.

When the blade contacts a structural support pole, the blade and blade arm rotate backwards till the blade is inside the side bar. The side bar pushes the frame away from the wall when it contacts the pole. When the blade passes the pole it returns to its original position but does not hit the wall because the frame was displaced by the depth of the side bar. The blade can be mounted to either the left side or the right side but not both simultaneously.

DETAILED DESCRIPTION OF THE INVENTION

Figure 1:
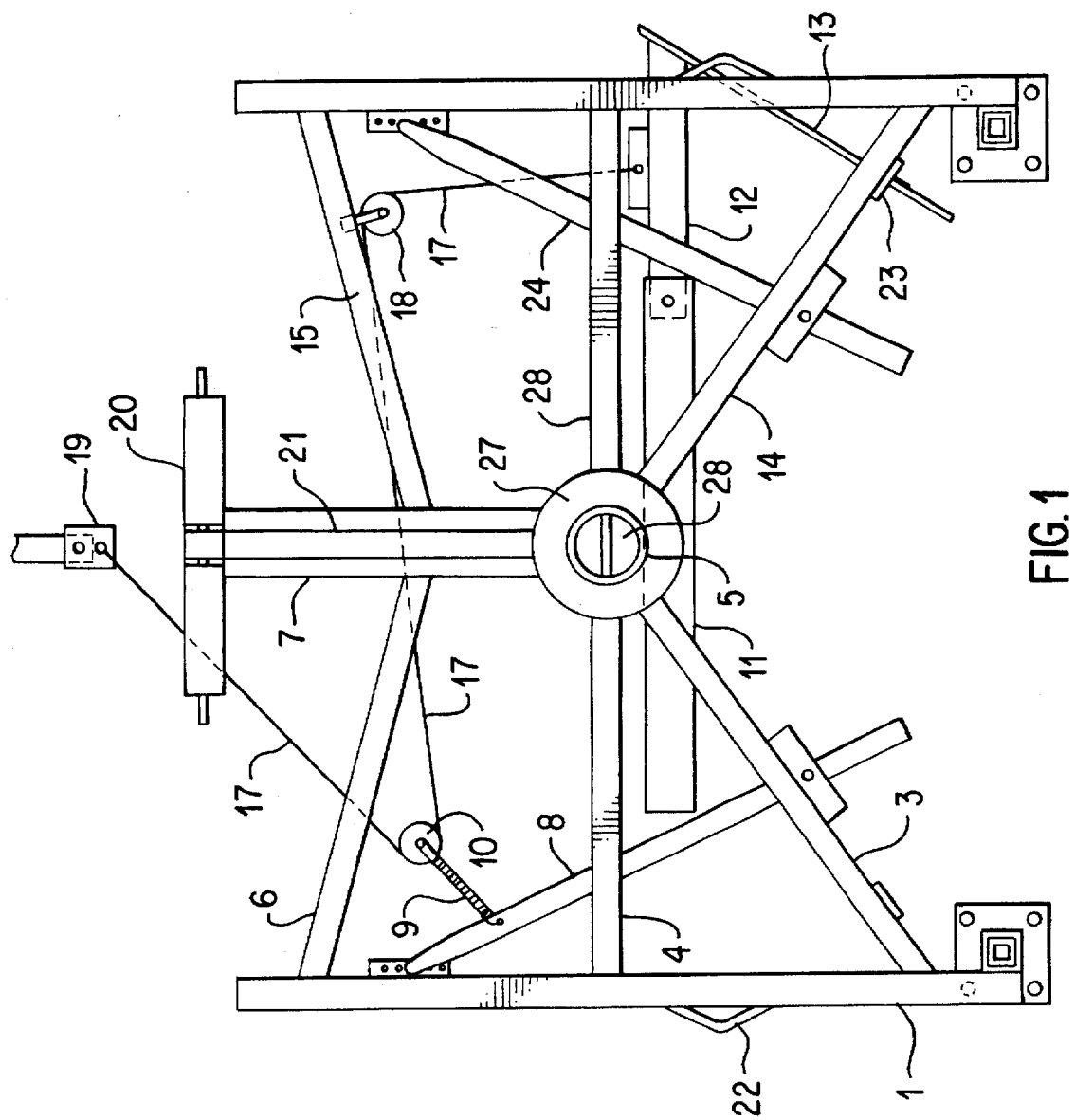
FIG. 1 is a top view of the invention.
Figure 2:
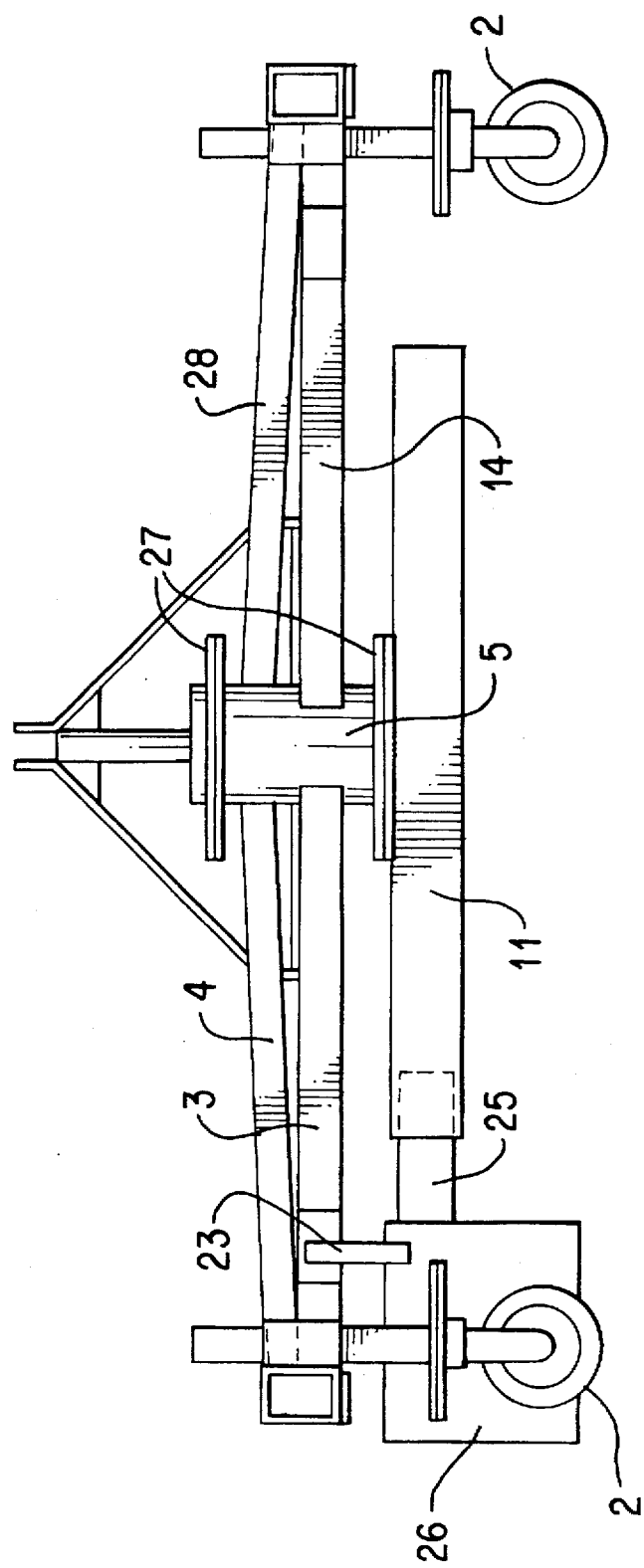
FIG. 2 is a rear view of the invention.

The frame can be broken down into several components. Left side member 1 is connected to central hub 5 by left rear support 3 and left center support 4. A wheel 2 (shown in FIG. 2) is attached to left side member one. A standard type 3 trailer hitch 20 is connected to central hub 5 by bottom hitch support 7 and top hitch support 21. Left side member 1 is connected to bottom hitch support 7 by left forward support 6. Right side member 16 is connected to central hub 5 by right rear support 14 and right central support 28. Wheel 2 is connected to right side support 16 (shown in FIG. 2) right side member 16 is connected to bottom hitch support 7 by right forward support 15. Central hub 5 is adapted to have a hole in the middle running its height. Side bar 20 is attached to left side support 1 and another side bar 22 is attached to right side 16. Side bars 22 are attached over the location where the blade will operate in its fully extended position.

To the frame various component parts are attached. Left rod 8 is adjustably attached to left side member 1 and adjustably attached to left rear support 3. Right rod 24 is adjustably attached to right side member 16 and adjustably attached to right rear support 14. Primary blade arm 11 is swivably mounted under central hub 5 by means of washers 27 and shaft 28 with pins holding washers 27 in place. Primary blade arm 11 is connected to shaft 28. The primary blade arm is preferably a hollow tube of square cross-sectional configuration.

For operation with a blade on the right side: right secondary blade arm 12 is removably attached to primary blade arm 11. Right blade 13 is attached to right secondary blade arm 12. Backstop 23 is attached to right blade 13. Spring 9 is removably attached to left rod 8. Pulley 10 is attached to spring 9. Pulley 18 is removably attached to right forward support 15. Cable 17 is removably attached to tractor 19 runs through pulley 10 and pulley 18 and is removably attached to right secondary blade arm 12.

For operation with a blade on the left side: left secondary blade arm 25 is removably attached to primary blade arm 11. Left blade 26 is attached to left secondary blade arm 25. Backstop 23 is attached to left blade 26. Spring 9 is removably attached to right rod 24. Pulley 10 is attached to spring 9. Pulley 18 is removably to left forward support 15. Cable is removably attached to tractor 19 run through 10 and pulley 18 and removably attached to left blade arm 25.

The secondary blade arm is preferably a hollow tube of square cross-sectional area, whose dimensions are sufficiently less than the primary blade arm to allow it to fit inside the hollow tube of the primary blade arm snugly with normal tolerances for removable parts. The means to removably attach the secondary arm is usually a pin or bolt that goes into a slot on the arm so that the secondary slides inside the primary and is pinned in place.

I desire to avail myself of the variations, modifications, alterations, equivalents and substitutes that are claimed as part of this invention.

I claim:

1. A chicken coop litter removal apparatus comprising:

a frame adapted to have a left side member connected to a central hub by a left rear support and a left center support, a right side member connected to the central hub by a right rear support and right central support with the central hub adapted to have a hole in it;

a trailer hitch connected to the central hub by a bottom hitch support and a top hitch support and connected to the left side member by a left forward support and connected to the right side member by a right forward support;

a right wheel attached to the right side member;

a left wheel attached to the left side member;

a left side bar attached to left side member;

a right side bar attached to right side member:

a left rod adjustably attached to the left side member and adjustably attached to the left rear support;

a primary blade arm mounted under central hub;

a means of mounting the primary blade arm under the central hub of the frame so as to allow the primary blade arm to rotate relative to the central hub about an axis centered on the hole in the central hub;

a right secondary blade arm removably attached to the primary blade arm;

a right blade attached to the right secondary blade arm under the location where the right side bar is attached to the frame and attached so as to operate in its fully extended position when the primary blade arm is generally perpendicular to the right side member;

a backstop attached to the right blade adapted to be in contact with the right rear support when the blade is in its fully extended location;

a spring removably attached to the left rod;

a first pulley attached to the spring;

a second pulley removably attached to the right forward support;

a cable removably attached to a tractor that is run through the first pulley and the second pulley and is removably attached to the right secondary blade arm.

2. A chicken coop litter removal apparatus comprising:

a frame adapted to have a left side member connected to a central hub by a left rear support and a left center support, a right side member connected to the central hub by a right rear support and right central support with the central hub adapted to have a hole in it;

a trailer hitch connected to the central hub by a bottom hitch support and a top hitch support and connected to the left side member by a left forward support and connected to the right side member by a right forward support;

a right wheel attached to the right side member;

a left wheel attached to the left side member;

a left side bar attached to left side member;

a right side bar attached to right side member:

a primary blade arm mounted under central hub;

a means of mounting the primary blade arm under the central hub of the frame so as to allow the primary blade arm to rotate relative to the central hub about an axis centered on the hole in the central hub;

a left secondary blade arm removably attached to the primary blade arm;

a left blade attached to the right secondary blade arm under the location where the right side bar is attached to the frame and attached so as to operate in its fully extended position when the primary blade arm is generally perpendicular to the right side member;

a backstop attached to the left blade adapted to be in contact with the left rear support when the blade is in its fully extended location;

a right rod adjustably attached to right side member and adjustably attached to the right rear support;

a spring removably attached to the right rod;

a first pulley attached to the spring;

a second pulley removably attached to the left forward support;

a cable removably attached to a tractor and then run through the first pulley and the second pulley and is removably attached to the left secondary blade arm.

3. A chicken litter removal apparatus comprising:

a frame adapted to have a central hub with a hole in it;

a blade pivotally mounted to the central hub underneath said frame extending beyond said frame;

a means to mount the blade to said frame at the central hub so adapted that the blade will rotate relative to the central hub about an axis at the approximate center of the hole in the central hub;

a tension means mounted to the frame and connected to the blade adapted to return the blade to its original position subsequent to it rotating relative to the central hub in response to an object striking the blade.

4. The apparatus claimed in claim 3 wherein a side bar is mounted to the frame side approximately over the blade adapted to extend less than the blade extends beyond the frame.

5. The apparatus claimed in claim 3 wherein the frame is a one piece component with a left side portion, a right side portion, a left rear portion, a right rear portion, a central hub portion adapted to have a hole in it and a trailer hitch portion which includes a bottom and a top.

6. The device claimed in claim 3 wherein a trailer hitch is connected to the central hub by a bottom hitch support and a top hitch support and connected to the frame.

7. The apparatus claimed in claim 3 when used in combination with a tractor wherein:

the frame adapted to have a left side member connected to the central hub by a left rear support and a left center support, a right side member connected to the central hub by a right rear support and right central support with the central hub adapted to have the hole in it;

a trailer hitch is connected to the central hub by a bottom hitch support and a top hitch support and connected to the left side member by a left forward support and connected to the right side member by a right forward support adapted to removably connect the frame to the tractor;

a left wheel is attached to the left side member;

a right wheel is attached to the right side member;

a left side bar is attached to left side member;

a right side bar is attached to right side member:

a left rod adjustably attached to the left side member and adjustably attached to the left rear support;

a right rod adjustably attached to right side member and adjustably attached to the right rear support;

a primary blade arm mounted under central hub;

a means of mounting the primary blade arm under the central hub of the frame so as to allow the primary blade arm to rotate relative to the central hub about an axis centered on the hole in the central hub;

a right secondary blade arm removably attached to the primary blade arm;

a right blade attached to the right secondary blade arm under the location where the right side bar is attached to the frame and attached so as to operate in its fully extended position when the primary blade arm is generally perpendicular to the right side member;

a backstop attached to the right blade adapted to be in contact with the right rear support when the blade is in its fully extended location;

a spring removably attached to the left rod;

a first pulley attached to the spring;

a second pulley removably attached to the right forward support;

a cable removably attached to a tractor that is run through the first pulley and the second pulley and is removably attached to the right secondary blade arm.

\* \* \* \* \*